Figure 1:
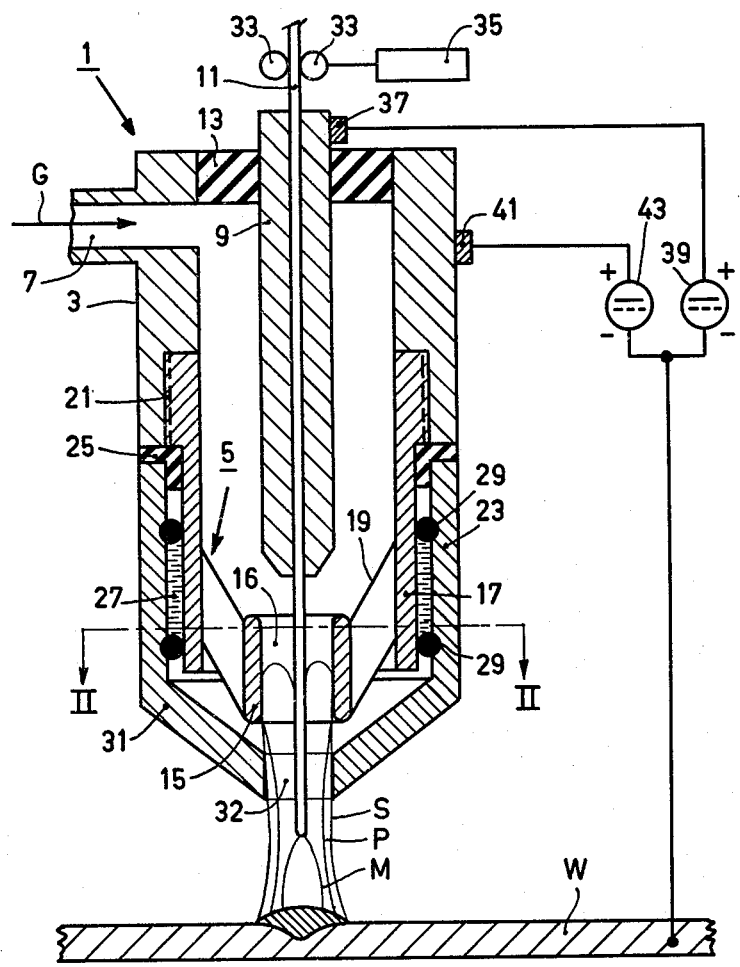

United States Patent [19]

Willems et al.

[11] 4,234,778
[45] Nov. 18, 1980

[54] METHOD OF AND WELDING TORCH FOR ARC WELDING

[75] Inventors: Gerardus A. M. Willems; Gerrit W. Tichelaar, both of Eindhoven, Netherlands

[73] Assignee: U.S. Philips Corporation, New York, N.Y.

[21] Appl. No.: 896,235

[22] Filed: Apr. 13, 1978

[30] Foreign Application Priority Data

Apr. 26, 1977 [NL] Netherlands .................. 7704527

[51] Int. Cl.$^3$ .............................................. B23K 9/16
[52] U.S. Cl. .............................. 219/121 P; 219/76.16; 219/75; 219/137 R
[58] Field of Search ............. 219/121 P, 121 R, 76.16, 219/75, 137 R; 313/231.3, 231.4

[56] References Cited

U.S. PATENT DOCUMENTS

| 3,242,305 | 3/1966 | Kare et al. ........................... 219/75 |
| 3,366,772 | 1/1968 | Wickham et al. ................. 219/75 X |
| 3,832,513 | 8/1974 | Klasson .................................. 219/74 |
| 4,101,751 | 7/1978 | Urbanic et al. ................... 219/121 P |

FOREIGN PATENT DOCUMENTS

| 2449795 | 5/1975 | Fed. Rep. of Germany ....... 219/121 P |
| 1444880 | 8/1976 | United Kingdom ................ 219/121 P |

Primary Examiner—B. A. Reynolds
Assistant Examiner—M. Paschall
Attorney, Agent, or Firm—Thomas A. Briody; William J. Streeter; Rolf E. Schneider

[57] ABSTRACT

Plasma-MIG welding in which a thermally ionizable gas stream is flowed through a nozzle non-consumable electrode having a central orifice and a surrounding annular opening toward a workpiece and is thereby split into a central gas column enveloped by an annular gas shield. A consumable electrode is fed through the central gas column toward the workpiece, with the establishment of a MIG-arc therebetween. A plasma arc is then spontaneously established by means of the MIG-arc between the nozzle non-consumable electrode and the workpiece. The central plasma gas column is accelerated by constriction of the annular gas shield downstream of the nozzle non-consumable electrode.

1 Claim, 2 Drawing Figures

U.S. Patent     Nov. 18, 1980     4,234,778

METHOD OF AND WELDING TORCH FOR ARC WELDING

This invention relates to a method of arc welding, wherein a MIG arc is maintained between a consumable electrode and a workpiece in a gas plasma which is enveloped by a shielding gas, said gas plasma being generated by a plasma arc between a non-consumable electrode and the workpiece, a gas of the same composition being used as the plasma gas as well as the shielding gas and being supplied as a common gas flow which is split into a central column of plasma gas and a jacket of shielding gas in the region of the non-consumable electrode.

A method of this kind is proposed in co-pending application Ser. No. 862,008 filed Dec. 19, 1977. The latter method aims to improve the welding process known from U.S. Pat. No. 4,016,397.

The present invention has for its object to increase the deposition rate of the consumable electrode, to improve the melting of the workpiece and the material transfer from the consumable electrode, and to extend the range of application of such welding process.

This object is mainly achieved in accordance with the invention in that the flow rate of the gas plasma is increased by constricting the shielding gas, and hence the gas plasma, downstream of the non-consumable electrode. Apparently, due to the constricting of the shielding gas jacket, part of the comparatively cold shielding gas is driven into the plasma column where it is heated, so that it expands. As a result, the flow rate of the gas plasma strongly increases. The increased flow rate of the gas plasma has two effects: the material transfer from the consumable electrode is strongly stimulated and the transfer of heat to the workpiece is increased. The advantages achieved by means of this method will be elaborated hereinafter.

The transfer current intensity of the welding current through the consumable electrode, beyond which the material transfer passes from a droplet transfer into a spray transfer, is substantially reduced, for example, from 160 A to 100 A for a consumable electrode of aluminium wire having a diameter of 1.2 mm. This readily results in a substantial improvement of the material transfer at low current intensities through the consumable electrode, i.e. stronger ejection of finer droplets; this is of major importance for welding "in position". For example, in the case of welding vertically disposed plates, the welding current through the consumable electrode should not be too high, because otherwise the molten pool becomes too hot and too large and hence drips off.

The droplets are heated for a shorter period of time and the consumable electrode is deposited faster, because a part of the energy which otherwise would cause overheating, is now used for melting the consumable electrode. For example, when aluminium wire is welded by means of the said, already known method, overheating is very high; at a current intensity of 160 A through the consumable electrode, a drop temperature of 1700° C. was measured; this means overheating by more than 1000° C. Experiments with the method in accordance with the invention have revealed an increase of the deposition rate of the consumable electrode of 40% per ampere delivered by the current source for the consumable electrode in comparison with the known method. For welding aluminium workpieces, a comparatively low temperature of the drops is also particularly advantageous, because less hydrogen is then absorbed from the atmosphere surrounding the welding arc, so that fewer pores occur in the weld in comparison with the said known method.

It will be clear from the foregoing that the method in accordance with the invention offers the following possibilities with respect to the known method and depending on practical requirements: increased deposition rate of the consumable electrode for a given welding current, so that a welding gap can be more quickly filled at the same heat input; or deposition of a given quantity of welding metal at a lower current intensity through the consumable electrode, and hence at a lower temperature of the molten pool, notably in the case of welding "in position"; or a combination of both possibilities, where obviously intermediate values are applicable as regards the deposition rate, the current intensity and the temperature of the molten pool.

Due to the increased thrust of the gas plasma flowing at a high rate, the heat transfer from the hot gas plasma to the melting zone in the workpiece is increased. Part of this increase of the heat transfer occurs because the liquid metal is blown away by the gas plasma, so that the solid bottom of the pool is exposed. For another part, the heat transfer from the quickly flowing gas plasma will be larger than from a gas which flows slower. As a result, better penetration of the workpiece is obtained, which is favourable in order to achieve a smooth transition.

It has also been found that, in spite of the constriction of the shielding gas jacket, the shielding of the plasma column by the shielding gas is maintained to a high degree. This is a very favourable side-effect which is important notably in the case of the welding of aluminium, where shielding of the molten pool against ingress of air is obtained to an extent which has proven to be adequate in practice. For welding other materials, additional gas shielding may be used, if necessary.

In spite of the fact that a given quantity of weld metal of lower temperature is deposited at a lower current intensity through the consumable electrode, so that the dimensions of the molten pool are smaller, the penetration of the workpiece increases. Moreover, a favourable method of droplet transfer is obtained. Notably welding "in position" is substantially improved; due to the necessarily low current intensity through the consumable electrode, the melting of the workpiece with the welding processes known thus far is often marginal, so that "bonding" defects may occur.

It is to be noted that the constricting of a gas plasma per se is already known from U.S. Pat. No. 2,847,555; however, the gas plasma is then directly constricted by a reduced plasma orifice; any shielding gas being separately supplied and being of a composition other than that of the plasma gas, however, is not constricted; moreover, because the consumable electrode is laterally introduced into the gas plasma, the described advantages and effects, notably as regards the consumable electrode, cannot be achieved or can only be partly achieved.

Workpieces welded by means of the method in accordance with the invention are characterized by a comparatively narrow bead, comparatively deep penetration and absence of pores at the welded point.

The invention also relates to a welding torch for performing the said method in accordance with the invention, comprising a housing with a nozzle provided with a plasma orifice, a gas inlet, a contact tube in the housing, and a gas conductor provided with an outlet aperture, the nozzle consisting of a central electrode ring which is connected to the housing by radially extending ribs which form gas passage ducts therebetween. A torch construction of this kind is proposed in said Application Ser. No. 862,008; the welding torch in accordance with the present invention is characterized in that the cross-sectional area of the outlet aperture is smaller than the combined cross-sectional area of the gas passage ducts and the plasma orifice in the nozzle. This welding torch strongly constricts the shielding gas jacket and the plasma column, so that the gas plasma is accelerated during its passage through the outlet aperture. The welding torch in accordance with the invention is very simple, small and rugged, and is suitable for fully automatic and semiautomatic welding as well as for use as a hand torch.

The described welding torch is suitable for obtaining a constriction effect, and hence acceleration of the gas plasma, but only if a given minimum quantity of gas is supplied to the welding torch. Because the ratio of the cross-sectional area of the outlet opening to the combined cross-sectional areas of the plasma orifice and the gas passage ducts is smaller than 1:1.3 and larger than 1:4 in a preferred embodiment of the welding torch in accordance with the invention, a constriction effect, and hence an acceleration of the gas plasma, is obtained in all circumstances.

A further preferred embodiment of the welding torch in accordance with the invention is characterized in that the cross-sectional area of the outlet aperture is equal to or smaller than the cross-sectional area of the plasma orifice. Thanks to this fact, the constriction effect of the outlet aperture and the acceleration of the gas plasma can be influenced by variation of the quantity of gas supplied to the welding torch per unit of time.

When use is made of the welding torch known from U.S. Pat. No. 4,016,397 gas quantities of from 15 to 40 l/min are supplied in practice. When such gas quantities are supplied, optimum constriction and acceleration of the gas plasma are obtained in a further preferred embodiment of the welding torch in accordance with the invention, in which the plasma orifice and the outlet aperture have a circular cross-section, and in which the outlet aperture and the plasma orifice each has a diameter of at least 6 mm and at the most 12 mm.

Figure 2:
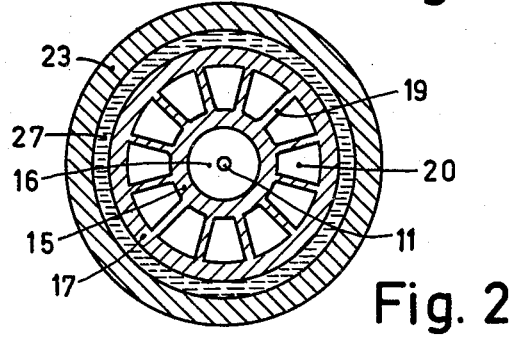

The invention will now be described in detail with reference to the accompanying drawing, in which FIG. 1 is a diagrammatic longitudinal sectional view of a welding torch in accordance with the invention;

FIG. 2 is a cross-sectional view of the welding torch, taken according to the line II—II in FIG. 1.

The welding torch 1 shown in FIGS. 1 and 2 comprises a housing 3 with a nozzle 5 and a gas inlet 7. In the housing 3 there is arranged a contact tube 9 which serves for the current transfer to and the guiding of a welding wire 11 to be deposited. The contact tube 9 is insulated from the housing 3 by means of an insulating ring 13. The nozzle 5 consists of a central electrode ring 15 which is provided with a plasma orifice 16 and which serves as a non-consumable electrode for a plasma arc, a support 17 which serves as a heat sink, and a number of radial ribs 19 which are preferably regularly distributed around the circumference of the electrode ring 15 in a spider-like manner and which connect the electrode ring 15 to the support 17.

The support 17 is mechanically, thermally and electrically connected to the housing 3 by way of a screwed connection 21. The nozzle 5 is surrounded by a mainly cylindrical gas conductor 23 which is insulated from the housing 3 by means of a ring 25 of a synthetic material and which surrounds the support 17 with clearance. A cooling water jacket 27 is formed between the gas conductor 23 and the support 17, this jacket being sealed by means of sealing rings 29 which also serve for the electrical insulation of the gas conductor 23 from housing 3. The cooling water jacket 27 communicates with connections (not shown) for the inlet and outlet of cooling water. The gas conductor 23 has a generally conical end 31 which is provided with an outlet aperture 32 and which extends, viewed in the axial direction, downstream of the electrode ring 15. The welding wire 11 is supplied by means of transport rollers 33 which are driven by a variable speed motor 35. The contact tube 9 is provided with a connection terminal 37 for electrical connection to one of the poles of a first power supply source 39, the other pole of which is connected to a workpiece W. The electrode ring 15 is connected, by way of ribs 19, support 17, housing 3 and a connection terminal 41 on the housing 3, to one of the poles of a second power supply source 43, the other pole of which is also connected to the workpiece W.

For the welding of the workpiece W, a gas flow G is supplied, via the gas inlet 7, which flows through the housing 3 in the direction of the nozzle 5. Subsequently, the welding wire 11 is fed and a MIG arc M is struck between the welding wire 11 and the workpiece W, for example by bringing the welding wire into contact with the workpiece. A plasma arc between the electrode ring 15 and the workpiece W is then spontaneously struck by the MIG arc. In the nozzle 5, the gas flow G is split into two parallel sub-flows by the electrode ring 15 and the ribs 19: namely a central gas column flowing through the plasma orifice and which, after the striking of the plasma arc between the electrode ring 15 and the workpiece W, is ionized to form the gas plasma P, and an annular jacket S of relatively cold, non-ionized sheathing or shielding gas which flows through gas passage ducts 20 present between the ribs 19 and which envelops and surrounds the gas plasma P. The ribs 19, via which the current is supplied to the electrode ring 15, also transfer heat from the electrode ring 15 to the support 17 which serves as a heat sink.

In accordance with the invention, the free sectional area of the outlet aperture 32 is smaller than the combined sectional areas of the gas passage ducts 20 and the plasma orifice 16. Preferably, the sectional area of the outlet aperture 32 is equal to or smaller than the sectional area of the plasma orifice.

Tests which were performed by means of a welding torch in which the outlet aperture and the plasma orifice had a circular cross-section and where the above ratios were adhered to, offered excellent results for diameters of the plasma orifice and the outlet aperture of between 6 mm and 12 mm; for the welding of aluminium and aluminium alloys, argon and mixtures of argon and helium were used, whilst for the welding of steel use was made of mixtures of argon and $CO_2$ or oxygen, the supplied quantities of gas varying from 15 to 40 l/min.

What is claimed is:

1. A method of plasma-MIG welding, which comprises providing a single nozzle non-consumable electrode having a central orifice and a surrounding annular opening; flowing a thermally ionizable gas stream from a common gas source through said single nozzle non-consumable electrode toward a workpiece, said single nozzle splitting said gas stream into a central gas column surrounded by a parallelly flowing annular gas sheath, said annular gas sheath and said central gas column having the same composition as they flow past the outlet of said single nozzle; feeding a consumable electrode through said central gas column toward the workpiece; first establishing a MIG-arc between said consumable electrode and said workpiece; then spontaneously establishing a plasma arc by means of said MIG-arc between said single nozzle non-consumable electrode and said workpiece to ionize said central gas column and sustain a plasma flow enveloping said MIG-arc, the surrounding annular gas sheath remaining non-ionized and relatively colder than the resulting central plasma gas column; and constricting the annular gas sheath downstream of the single nozzle non-consumable electrode to drive the relatively colder gas sheath into the central plasma gas column to expand the former by heating whereby the central plasma gas column is also constricted and its flow rate is increased.

* * * * *